US006984438B1

(12) United States Patent
Nickel

(10) Patent No.: US 6,984,438 B1
(45) Date of Patent: *Jan. 10, 2006

(54) MASKING STRIP AND THE USE THEREOF

(75) Inventor: Oliver Nickel, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/431,849

(22) Filed: Nov. 2, 1999

(30) Foreign Application Priority Data

Nov. 6, 1998 (DE) ................................. 198 51 191

(51) Int. Cl.
*B32B 3/00* (2006.01)
*B32B 7/02* (2006.01)
*B32B 15/04* (2006.01)
*B32B 31/00* (2006.01)
*B05D 5/00* (2006.01)

(52) U.S. Cl. ...................... 428/156; 428/212; 428/220; 428/213; 428/343; 427/256; 427/282; 427/259; 156/241; 156/229; 156/227

(58) Field of Classification Search ................ 428/353, 428/343, 40.1, 220, 156, 212, 213; 427/259, 427/256, 282, 241; 156/229, 227
See application file for complete search history.

(56) References Cited

U.S. PATENT DOCUMENTS

| 4,889,759 | A |   | 12/1989 | Yamazaki ................... 428/181 |
|-----------|---|---|---------|-------------------------------------|
| 5,385,783 | A | * | 1/1995  | Patel et al. ................. 428/353 |
| 5,683,806 | A | * | 11/1997 | Sakumoto et al. .......... 428/343 |
| 5,935,669 | A |   | 8/1999  | Leeuwenburgh ........... 428/40.1 |
| 6,723,406 | B2| * | 4/2004  | Nickel ........................ 428/40.1 |

FOREIGN PATENT DOCUMENTS

| DE | 296 17 896 U1 | 1/1997 |
| EP | 0 841 384 A2  | 5/1998 |
| FR | 1466071       | 3/1967 |

* cited by examiner

*Primary Examiner*—Rena Dye
*Assistant Examiner*—Lawrence Ferguson
(74) *Attorney, Agent, or Firm*—Norris McLaughlin & Marcus PA

(57) ABSTRACT

Masking strip comprised of:
  e) a heat-resistant adhesive tape (1) with a paper support (2) and a self-adhesive composition (3),
  f) a masking paper (5) with good paint adhesion and absorbency duplexed in the marginal area (4) of the self-adhesive composition, as well as
  g) a masking film (6) duplexed in the same marginal area of the self-adhesive composition (3),
  h) the masking film (6) completely covering the masking paper (5) on the side on which the self-adhesive composition (3) of the adhesive tape (1) is situated and thus lies behind the masking paper (5) in the adhered state.

10 Claims, 1 Drawing Sheet

MASKING STRIP AND THE USE THEREOF

The invention relates to a masking strip for covering certain parts especially when painting automobiles, and the use thereof. Especially provided is the masking of medium to large surfaces which must not come in contact with paint during finish repair work in automobile repair shops.

BACKGROUND OF THE INVENTION

Such masking strips and covers are known and widely in use. Standard materials include special papers or newsprint of approximately 50 g weight, but also folded plastic covers approximately 30 $\mu$m thick (approx. 30 g/m$^2$), or "endless" films from a large roll (2 m wide) plus "2 in 1" systems which are folded polyethylene films combined with adhesive tape, and lastly also polyethylene-coated papers combined with adhesive tape.

The main requirements of such masking systems are:

Paint adhesion—after oven drying the paint must not fall from the masking material onto the fresh paint.

Waste—a low volume of waste is important, since the cost of disposal is determined accordingly.

Number of persons—Normally a car is worked on by only one painter. Therefore the masking should be easy for one person to apply.

Number of working steps—few and quick working steps are called for.

Material consumption: To apply the masking a temperature-appropriate masking tape is necessary. The consumption of masking material and adhesive tape is to be low.

The masking strips and the like that are known heretofore satisfy such requirements to only a limited extent.

|  | Advantages | Disadvantages |
| --- | --- | --- |
| Papers | Optimum paint adhesion even when the paint applied in the marginal area is thick. Low cost | Paint strike-through, particularly when paint application is too thick in the marginal area. Masking must be provided with adhesive tape after application. Masking not dispensed directly onto the vehicle. Thus, to some extent, too much material is consumed, since often too much or too little paper is dispensed. |
| Plastic covering | No paint strike-through. The entire vehicle is covered. The plastic masking can easily be trimmed to expose the area that is to be painted. | Paint adhesion not the best Relatively greater cost per square meter. Great material consumption since always only the entire area can be masked. Masks usually have paint on them, so that in the masked state the cars cannot be moved about. |
| Endless film | See plastic covering | See plastic covering (exception: material consumption since partial covering can also be used). |
| 2-in-1 systems, folded films with masking tape | No strike-through of paint in the case of films. No paint strike-through, and sufficient adhesion in the case of polyethylene-coated paper. | Optimum result only when both products are used (i.e., paper in the edges and film on the wide surface) |
| Polyethylene coated paper with masking tape | Dispensed onto the vehicle manually not much Little waste with polyethylene film 10 $\mu$m thick | Both products are equipped with masking tape Due to the coating (lamination) and the bleach (white), paper is not environmentally friendly and is expensive. |

It was the purpose of the invention to provide a remedy here, and especially to create a masking strip in which a cheap, absorbent paper can be used, especially one which is not coated, coated with polyethylene, for example, and which can therefore be disposed of more easily and in a more environmentally acceptable manner, but which at the same time has good adhesion for lacquer and the like (paint adhesion).

This purpose is accomplished with a masking tape as is characterized in the claims.

The invention thus combines the very good properties of papers as regards paint adhesion and the very good properties of films in regard to the prevention of paint strike-through, in a handy product.

SUMMARY OF THE INVENTION

The products thus comprise three products in one and can therefore be called a "3-in-one" product. The components are paper, film and backing. The following are preferred:

as the paper: 30–40 g/m$^2$ unbleached kraft paper, 20–40 cm wide as the film: 10 $\mu$m (=10 g/m$^2$) pretreated (corona) polyethylene film (surface tension approximately 2000 mm. Variable length, as a rule between 10 and 30 m.

as the adhesive tape: adhesive tape approximately 25 mm wide, heat resistant (about 80° C.) for the car painter (e.g., "tesa" 4309 etc.).

The paper serves to absorb the heavier paint application in the marginal area of the paint and to hold tight even after the oven drying, so that no paint can fall onto the still soft, fresh lacquer. The film is preferably prepared by the corona treatment so that a paint mist will be securely attached to it. Furthermore, the film prevents paint from striking through the paper onto the lacquer.

DETAILED DESCRIPTION

In detail the following product advantages result:

Optimum paint adhesion, a) in the critical marginal area on account of the absorbent paper, and b) on the rest of the mask surface due to the specially treated film, Optimum protection by the film against paint strike-through.

Considerably less waste due to the thinness of the film (e.g., thickness 5×less than 50 g paper), Handled by only one person due to the handy shape and the premanufactured product.

Optimum consumption of material, a) in regard to the mask material due to direct dispensing to the vehicle, and b) in connection with the adhesive tape due to the standardized width, e.g., 25 mmm Saving of time due to small number of work steps (3 in 1).

Product advantages in comparison to the "2 in 1" system:

Inexpensive, untreated standard kraft paper, with which the painter is familiar, can be used, Marginal area and large surface covered in a single operation, Masking tape is needed only once.

The invention is to be described below with the aid of an example, without any intention of limiting it unnecessarily.

BRIEF DESCRIPTION OF THE DRAWINGS

In particular, FIGS. 1–3 show an adhesive tape 1 comprising a paper support 2 and a contact adhesive 3. Especially suitable for it is a heat-resistant so-called "masking tape," which withstands oven drying at up to 130° C. (1 hour), commercially obtainable from Beiersdorf AG, Germany, as "tesa 4309," width 25 mm, thickness 170 μm, adhesion to steel 8.75 N/25 mm. On the one marginal area 4 of this adhesive tape (1) an unbleached kraft paper 5, 30 cm wide, 35 g/m², is adhered as a masking paper 5 on a width of 3 mm. Alongside this masking paper 5 a masking film 6 is adhered onto the next part of this marginal area 4, a corona-treated polyethylene film 1 m wide and 10 μm thick and folded.

Figure 1:
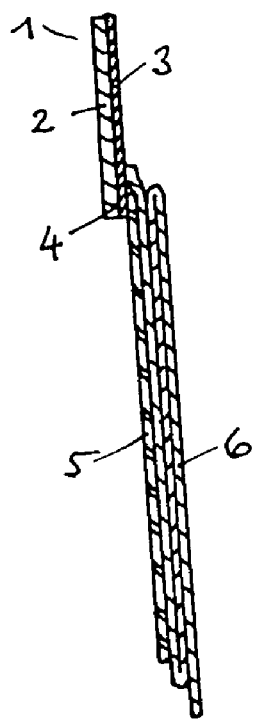
FIG. 1 is a diagrammatic side view of a masking strip according to the invention with a folded masking film, FIG. 2 a view as in FIG. 1, but with partially unfolded masking film, and FIG. 3 a view as in FIG. 1, but now the masking film is entirely unfolded.
Figure 2:
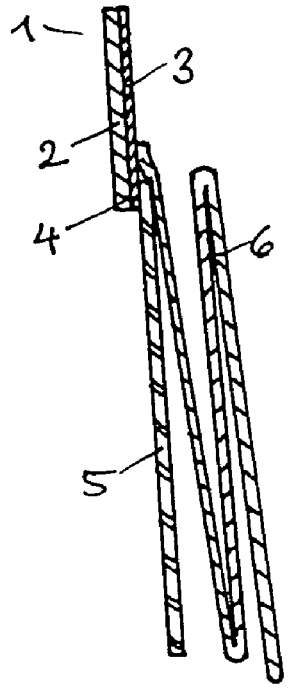
Figure 3:
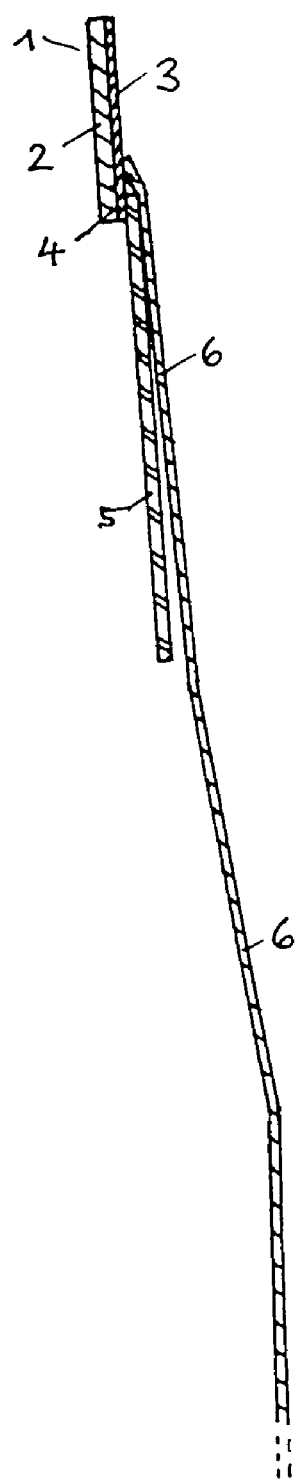

The folding of the masking film 6 is known in itself and is performed in the known manner to which the user is accustomed, the entire masking strip being wound in a roll for ease of use.

What is claimed is:

1. A self-adhesive masking strip, comprised of
   a) a heat-resistant adhesive tape comprising a paper support one side of which is coated with a contact adhesive;
   b) a masking paper adhered to and only partially covering said one side of said adhesive tape and having a width which extends from the locus of its adhesion to said one side of said adhesive tape to beyond one width boundary of said adhesive tape; and
   c) a masking film adhered to and only partially covering the part of said one side of said adhesive tape left uncovered by said masking paper, and which overlaps and covers said masking paper and has a width which exceeds the width of said masking paper.

2. Masking strip according to claim 1, wherein the adhesive tape is a heat-resistant adhesive tape with a heat resistance of a maximum of 130° C. (1 hour).

3. Masking strip according to claim 1, wherein the adhesive tape is 15–75 mm wide.

4. Masking strip according to claim 1, wherein the paper support is creped, stretchable and flexible and has good paint adhesion, and the entire adhesive tape has a thickness of 100–250 μm.

5. Masking strip according to claim 1, wherein the masking paper is an unbleached kraft paper of 30–40 g/m² and a width of 15–50 cm.

6. Masking strip according to claim 1, wherein the masking film is a polyolefin film 7–40 μm thick, which is corona pretreated, and is 0.5–2 μm wide.

7. Masking strip according to claim 1, wherein the masking film is folded according to the dimensions of the masking paper and is folded against the latter accordionwise.

8. Masking strip according to claim 1, wherein the marginal area of the self-adhesive composition to which the masking paper adheres, is 1–5 mm wide.

9. Masking strip according to claim 1, wound into a roll, the masking film being folded and the length of the roll corresponding approximately to the width of the masking paper plus the width of the adhesive tape.

10. A method for painting an automobile, wherein parts of the automobile are not to be painted, which comprises masking parts of said automobile which are not to be painted with a masking strip according to claim 1.

* * * * *